US011128647B2

United States Patent
Smith et al.

(10) Patent No.: US 11,128,647 B2
(45) Date of Patent: Sep. 21, 2021

(54) CRYPTOCURRENCIES MALWARE BASED DETECTION

(71) Applicant: British Telecommunications Public Limited Company, London (GB)

(72) Inventors: Karl Smith, London (GB); Fadi El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 308 days.

(21) Appl. No.: 16/086,087

(22) PCT Filed: Mar. 3, 2017

(86) PCT No.: PCT/EP2017/055090
§ 371 (c)(1),
(2) Date: Sep. 18, 2018

(87) PCT Pub. No.: WO2017/167547
PCT Pub. Date: Oct. 5, 2017

(65) Prior Publication Data
US 2020/0296120 A1    Sep. 17, 2020

(30) Foreign Application Priority Data
Mar. 30, 2016   (EP) .................................... 16162915

(51) Int. Cl.
*H04L 29/06* (2006.01)
*G06N 20/00* (2019.01)
*G16Y 30/10* (2020.01)

(52) U.S. Cl.
CPC ......... *H04L 63/1425* (2013.01); *G06N 20/00* (2019.01); *G16Y 30/10* (2020.01); *H04L 63/145* (2013.01)

(58) Field of Classification Search
CPC ... H04L 63/1425; H04L 63/145; G06N 20/00; G16Y 30/10; G06F 21/552
See application file for complete search history.

(56) References Cited

U.S. PATENT DOCUMENTS 6,192,405 B1   2/2001   Bunnell
7,716,739 B1   5/2010   McCorkendale et al.
(Continued)

FOREIGN PATENT DOCUMENTS

EP    2381363 A2   10/2011
EP    2101599 B1   9/2013
(Continued)

OTHER PUBLICATIONS

D. K. Limthong and T. Tawsook, "Network traffic anomaly detection using machine learning approaches," 2012 IEEE Network Operations and Management Symposium, Maui, HI, 2012, pp. 542-545. (Year: 2012).*
(Continued)

*Primary Examiner* — Robert B Leung
(74) *Attorney, Agent, or Firm* — Patterson Thuente Pedersen, P.A.

(57) ABSTRACT

A computer implemented method to identify a computer security threat based on communication of a network connected device via a computer network including receiving a plurality of blocks of network traffic from the device, each block including a sequence of network traffic data items being identifiable by a position in the sequence of the block; identifying a subset of positions occurring in every block for which a degree of variability of values of data items in each position of the subset meets a predetermined threshold; and generating executable code for performing a plurality of processing operations based on the identified subset of positions, the executable code consuming a determinate
(Continued)

quantity of computing resources when executed for the received network traffic.

11 Claims, 3 Drawing Sheets

(56) References Cited

U.S. PATENT DOCUMENTS

| | | | |
|---|---|---|---|
| 7,797,748 | B2 | 9/2010 | Zheng et al. |
| 7,870,153 | B2 | 1/2011 | Croft et al. |
| 8,271,974 | B2 | 9/2012 | Mazhar et al. |
| 8,375,437 | B2 | 2/2013 | Linsley et al. |
| 8,479,294 | B1 | 7/2013 | Li et al. |
| 8,516,241 | B2 | 8/2013 | Chang et al. |
| 8,739,155 | B2 | 5/2014 | Hehir et al. |
| 9,009,825 | B1* | 4/2015 | Chang ............... H04L 63/1425 726/22 |
| 9,183,378 | B2 | 11/2015 | Banerjee et al. |
| 9,235,813 | B1 | 1/2016 | Qian et al. |
| 9,466,051 | B1 | 10/2016 | Roth et al. |
| 9,495,668 | B1 | 11/2016 | Juels |
| 9,807,106 | B2 | 10/2017 | Daniel et al. |
| 2002/0100035 | A1 | 7/2002 | Kenyon et al. |
| 2002/0120725 | A1 | 8/2002 | DaCosta et al. |
| 2003/0084349 | A1 | 5/2003 | Friedrichs et al. |
| 2003/0204644 | A1 | 10/2003 | Vincent |
| 2004/0015977 | A1 | 1/2004 | Benke et al. |
| 2004/0268296 | A1 | 12/2004 | Kayam et al. |
| 2005/0091269 | A1 | 4/2005 | Gerber et al. |
| 2006/0282660 | A1 | 12/2006 | Varghese et al. |
| 2009/0254499 | A1 | 10/2009 | Deyo |
| 2010/0011029 | A1* | 1/2010 | Niemela ............... H04L 63/145 707/E17.044 |
| 2010/0262873 | A1 | 10/2010 | Chang et al. |
| 2011/0197070 | A1 | 8/2011 | Mizrah |
| 2011/0265154 | A1 | 10/2011 | Furlan et al. |
| 2012/0053925 | A1 | 3/2012 | Geffin et al. |
| 2012/0215727 | A1 | 8/2012 | Malik et al. |
| 2012/0246290 | A1 | 9/2012 | Kagan |
| 2012/0284794 | A1 | 11/2012 | Trent et al. |
| 2012/0304007 | A1 | 11/2012 | Hanks et al. |
| 2012/0311526 | A1 | 12/2012 | Deanna et al. |
| 2013/0006949 | A1 | 1/2013 | Essawi et al. |
| 2014/0067734 | A1 | 3/2014 | Hawkins et al. |
| 2014/0164251 | A1 | 6/2014 | Loh et al. |
| 2014/0180738 | A1 | 6/2014 | Phillipps et al. |
| 2014/0215490 | A1 | 7/2014 | Mathur et al. |
| 2014/0298011 | A1 | 10/2014 | Ganesan |
| 2014/0344015 | A1 | 11/2014 | Puertolas-Montanes et al. |
| 2014/0358825 | A1 | 12/2014 | Phillipps et al. |
| 2014/0372346 | A1 | 12/2014 | Phillipps et al. |
| 2015/0120567 | A1 | 4/2015 | Van Rooyen et al. |
| 2015/0128263 | A1* | 5/2015 | Raugas ............... H04L 63/1433 726/23 |
| 2015/0134606 | A1 | 5/2015 | Magdon-Ismail et al. |
| 2015/0227741 | A1 | 8/2015 | Permeh et al. |
| 2015/0271318 | A1 | 9/2015 | Antos et al. |
| 2015/0332283 | A1 | 11/2015 | Witchey |
| 2015/0332395 | A1 | 11/2015 | Walker et al. |
| 2015/0356523 | A1 | 12/2015 | Madden |
| 2015/0356555 | A1 | 12/2015 | Pennanen |
| 2015/0363876 | A1 | 12/2015 | Ronca et al. |
| 2015/0379423 | A1 | 12/2015 | Dirac et al. |
| 2016/0048771 | A1 | 2/2016 | Chen et al. |
| 2016/0057041 | A1 | 2/2016 | Gupta et al. |
| 2016/0078367 | A1 | 3/2016 | Adjaoute |
| 2016/0086175 | A1 | 3/2016 | Finlow-Bates et al. |
| 2016/0091540 | A1* | 3/2016 | Marti ............... G01R 21/1333 702/62 |
| 2016/0098730 | A1 | 4/2016 | Feeney |
| 2016/0164884 | A1 | 6/2016 | Sriram et al. |
| 2016/0221186 | A1 | 8/2016 | Perrone |
| 2016/0260095 | A1 | 9/2016 | Ford |
| 2016/0283920 | A1 | 9/2016 | Fisher et al. |
| 2016/0350173 | A1 | 12/2016 | Ahad |
| 2017/0063886 | A1 | 3/2017 | Muddu et al. |
| 2017/0109735 | A1 | 4/2017 | Sheng et al. |
| 2017/0124534 | A1 | 5/2017 | Savolainen |
| 2017/0279774 | A1 | 9/2017 | Booz et al. |
| 2017/0279818 | A1 | 9/2017 | Milazzo et al. |
| 2017/0286136 | A1 | 10/2017 | Dimitrakos et al. |
| 2018/0025166 | A1 | 1/2018 | Daniel et al. |
| 2018/0144114 | A1 | 5/2018 | Fiske |
| 2018/0232526 | A1 | 8/2018 | Reid et al. |
| 2018/0285585 | A1 | 10/2018 | Daniel et al. |
| 2019/0036895 | A1 | 1/2019 | Irvine |
| 2019/0050541 | A1 | 2/2019 | Wright |
| 2019/0139136 | A1 | 5/2019 | Molinari et al. |

FOREIGN PATENT DOCUMENTS

| | | |
|---|---|---|
| EP | 2816469 A1 | 12/2014 |
| EP | 3101599 A2 | 12/2016 |
| GB | 2540976 A | 2/2017 |
| GB | 2540977 A | 2/2017 |
| WO | WO-0184285 A2 | 11/2001 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 | 11/2015 |
| WO | WO-2016034496 A1 | 3/2016 |
| WO | WO-2016077127 A1 | 5/2016 |
| WO | WO-2016191639 A1 | 12/2016 |
| WO | WO-2017021153 A1 | 2/2017 |
| WO | WO-2017021154 A1 | 2/2017 |
| WO | WO-2017021155 A1 | 2/2017 |
| WO | WO-2017054985 A1 | 4/2017 |
| WO | WO-2017167547 A1 | 10/2017 |
| WO | WO-2017167548 A1 | 10/2017 |
| WO | WO-2017167549 A1 | 10/2017 |
| WO | WO-2017167550 A1 | 10/2017 |

OTHER PUBLICATIONS

"A Next-Generation Smart Contract and Decentralized Application Platform" Ethereum White Paper, 2016, retrieved from https://github.com/ethereum/wiki/wiki/White-Paper.

Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.

Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.

Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.

Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/st=itbp2q49&sh=d8cc4355 on Sep. 29, 2016.

Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.

Anonymous, "Colored Coins—Bitcoin Wiki," Retrieved from https://en.bitcoin.it/w/index.php?title=ColoredCoins&oldid=57259, Jul. 7, 2015, 6 pages.

Antonopoulos A M., "Mastering Bitcoin-Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.

(56) References Cited

OTHER PUBLICATIONS

Application and Filing Receipt for U.S. Appl. No. 15/749,391, filed Jan. 31, 2018, Inventor: Daniel et al, 202 pages.
Application and Filing Receipt for U.S. Appl. No. 15/749,289, filed Jan. 31, 2018, Inventor: Ducatel et al, 174 pages.
Application and Filing Receipt for U.S. Appl. No. 15/223,261, filed Jul. 29, 2016, Inventor: Daniel et al, 182 pages.
Application and Filing Receipt for U.S. Appl. No. 15/749,338, filed Jan. 31, 2018, Inventor: Daniel et al.
Assia Y., et al., "Colored Coins Whitepaper," 2015, available at docs.google.com/document/d/1AnkPcVZTCMLizw4DvsW6M8Q2JCOllzrTLuoWu2z1BE, 23 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.
Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
Czepluch J.S., et al., "The Use of Block Chain Technology in Different Application Domains," XP055242451, retrieved from http://http://www.lollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Extended European Search Report for Application No. EP15179440.1, dated Feb. 10, 2016, 6 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., "On Intelligence, How a New Understanding of the Brain Will Lead to the Creation of Truly Intelligent Machines," Times Books, ISBN 0-8050-7 456-2, 2004, 174 pages.
Hawkins, et al., "Why Neurons Have Thousands of Synapses, A Theory of Sequence Memory in Neocortex," Published in Frontiers in Neural Circuits (10 (2016) 1-13, doi:10.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.

International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055095, dated Apr. 11, 2017, 10 pages.
International Preliminary Report on Patentability for Application No. PCT/EP2017/055095, dated Oct. 11, 2018, 8 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
British Telecommunications Public Limited Company, "Threat Intelligence Visibility—the way forward," BT, 2015, available from www.globalservices.bt.com/uk/en/products/assure threat_monitoring.
Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.
Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, A Strategy Employed by VI?" Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenFieldl997.pdf, Dec. 24, 1996, 15 pages.
Plohmann D., et al., "Case study of the Miner Botnet", Cyber Conflict (CYCON), 2012 4th International Conference on Jun. 5, 2012, pp. 1-16.
International Search Report and Written Opinion for PCT Application No. PCT/EP2016/067308, dated Sep. 21, 2016, 8 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.

(56) References Cited

OTHER PUBLICATIONS

Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
International Preliminary Report on Patentability for Application No. PCT/EP2017/055094, dated Oct. 11, 2018, 8 pages.
International Search Report and Written Opinion for Application No. PCT/EP2017/055094, dated May 15, 2017, 10 pages.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2015.
Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.
Application as filed for U.S. Appl. No. 16/086,058, filed Sep. 18, 2018, Inventor: Daniel et al.
Application as filed for U.S. Appl. No. 16/086,074, filed Sep. 18, 2018, Inventor: Daniel et al.
Application as filed for U.S. Appl. No. 16/086,109, filed Sep. 18, 2018, Inventor: Daniel et al.
Application as filed for U.S. Appl. No. 16/086,142, filed Sep. 18, 2018, Inventor: El-Moussa et al.
Application as filed for U.S. Appl. No. 16/086,230, filed Sep. 18, 2018, Inventor: El-Moussa et al.
Application and Filing Receipt for U.S. Appl. No. 15/548,654, filed Aug. 3, 2017, Inventor: Daniel et al., 195 pages.
Bakshi, et al., "Securing Cloud from DDOS Attacks Using Intrusion Detection System in Virtual Machine," IEEE, 2010, 5 pages.
Bellifemine, et al., "Jade: A Software Framework for Developing Multi-Agent Applications. Lessons Learned," Elsevier, 2007, 12 pages.
Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.
Combined Search and Examination Report for Great Britain Application No. 1707379.2, dated Nov. 9, 2017, 9 pages.
Combined Search and Examination Report for Great Britain Application No. 1707377.6, dated Nov. 9, 2017, 9 pages.
Combined search and Examination Report under Sections 17 and 18(3) for Great Britain Application No. 1707376.8, dated Nov. 9, 2017, 8 pages.
Combined search and Examination Report under Sections 17 and 18(3) for Great Britain Application No. 1707378.4, dated Nov. 9, 2017, 11 pages.
European Search Report for Application No. EP17164006.3, dated Jun. 29, 2017, 6 pages.
Extended European Search Report for Application No. 17170020.6, dated Nov. 10, 2017, 8 pages.
Extended European Search Report for Application No. 17170022.2, dated Nov. 16, 2017, 8 pages.
Extended European Search Report for Application No. 17170024.8, dated Nov. 10, 2017, 10 pages.
Extended European search report for Application No. 16162915.9, dated Oct. 10, 2016, 11 pages.
Fiore U., "Network Anomaly Detection with the Restricted Boltzmann Machine," Neurocomputing, 2013, 11 pages.
Hinton G.E., et al., "Reducing the Dimensionality of Data with Neural Networks," Science, vol. 313, Jul. 28, 2006, pp. 504-507.
International Preliminary Report for Application No. PCT/EP2018/061261, dated Nov. 21, 2019, 8 pages.
International Preliminary Report on Patentability for Application No. PCT/EP2015/069670, dated Mar. 16, 2017, 7 pages.
International Preliminary Report on Patentability for Application No. PCT/EP2015/069673, dated Mar. 16, 2017, 9 pages.
International Preliminary Report on Patentability for Application No. PCT/EP2016/052865, dated Aug. 24, 2017, 9 pages.
International Search Report and Written Opinion for Application No. PCT/EP2018/061405, dated Jun. 20, 2018, 12 pages.
International Search Report and Written Opinion for Application No. PCT/EP2018/061406, dated Jun. 20, 2018, 13 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.
International Preliminary Report on Patentability for Application No. PCT/EP2018/061408, dated Nov. 21, 2019, 10 pages.
International Search Report and Written Opinion for Application No. PCT/EP2015/069670, dated Nov. 11, 2015, 8 pages.
International Search Report and Written Opinion for Application No. PCT/EP2015/069673, dated Nov. 12, 2015, 10 pages.
International Search Report and Written Opinion for Application No. PCT/EP2016/052865, dated Mar. 17, 2016, 11 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 11 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.
International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
Jin, et al., "A Guest-Transparent File Integrity Monitoring Method In Virtualization Environment," Elsevier, 2010, 11 pages.
Patel H, "A block chain based decentralized exchange," International Association for Cryptologic Research, XP061017563, Dec. 18, 2014, vol. 20141225:065012, 9 pages.
Search Report dated Nov. 8, 2017 for Great Britain Application No. GB1707381.8, 7 pages.
Wu J., et al., "Hierarchical Temporal Memory Method for Time-Series-Based Anomaly Detection," 2016, IEEE, 16th International Conference Data Mining Workshops, XP033055893, Dec. 2016, pp. 1167-1172.
Zambonelli, et al., "Agent-Oriented Software Engineering for Internet Applications," Coordination of Internet Agents: Models, Technologies, and Applications, Chapter—13, Springer, 2000, 21 pages.
Zupan B., et al., "Machine Learning by Function Decomposition," ICML 1997, Retrieved from http://citeseerx.ist.psu.edu/viewdoc/download?doi=10.1.1.29.4455&rep=rep1&type=pdfon Oct. 17, 2017, 9 pages.

* cited by examiner

FIGURE 4

CRYPTOCURRENCIES MALWARE BASED DETECTION

CROSS-REFERENCE TO RELATED APPLICATION

The present application is a National Phase entry of PCT Application No. PCT/EP2017/055090, filed Mar. 3, 2017, which claims priority from EP Patent Application No. 16162915.9, filed Mar. 30, 2016 each of which is hereby fully incorporated herein by reference.

TECHNICAL FIELD

The present disclosure relates to the identification of threats in network communication between network connected devices.

BACKGROUND

Devices are increasingly becoming network connected by connection to computer networks for communication with clients, servers, each other, publication of information or other purposes. This trend has been described as developing an "internet of things" (IoT) in which devices of many potentially disparate kinds and purposes are network connected, including, inter alia: domestic appliances and equipment; utility supply and control apparatus such as energy supply and control; commercial machinery and plant; vehicles; sensors and detectors; lighting; heating; media devices including audio and video; medical devices; learning aids; timepieces; data storage devices; food preparation and storage devices; agricultural apparatus; human and animal monitoring devices; personal possessions; articles of fashion including clothing and footwear; roadside apparatus such as traffic monitors; street furniture; and many other devices and apparatus as will be apparent to those skilled in the art. The motivation for network connection of such devices can be varied including, for example: a desire to share information about a state, configuration, presence, environment, locality or arrangement of a device; communication of events, alerts, states or state changes relating to a device; for multiple devices to collaborate, coexist, cooperate, communicate or the like; to generate sensory output for subsequent consumption, recording or the like; for control of devices such as by network configuration, control, installation, modification, operation and the like; and many other purposes as will be apparent to those skilled in the art.

Each network connected device presents a potential vulnerability to a network and other devices connected thereto which malicious agents or entities might seek to exploit for malicious purposes. For example, network connected devices can be subject to spoofing, unauthorized access, unauthorized modification and/or unauthorized use. Such network connected devices can be furnished with little processing resource (so as to reduce manufacturing and operating costs, for example) and traditional security mechanisms such as intrusion detection services, antimalware services, firewalls and antivirus services may be difficult to accommodate for or by the device without unduly impacting the limited resource of the device or other operation of the device or may simply be too costly in view of the value or cost of the device.

Responsibility for monitoring for network threats can be deferred to and discharged by network components such as routers, switches, proxies or dedicated network security or service apparatus shared or protected by potentially numerous network connected devices. However, a particular challenge with IoT network connected devices in view of a potentially wide distribution of such devices across networks and in view of potentially many different versions of such devices occurring variously throughout the networks is a need to consistently apply threat detection for similar devices across the entire network. For example, a first version or release of a network connected domestic appliance may be susceptible to a first security threat. A second version or release of the same domestic appliance may not be susceptible to the first threat but may be susceptible to a second threat. Thus deployments across multiple interconnected networks of mixtures of both versions of the domestic appliance need to accommodate identification of and/or protection against both threats sensitive to the differences between versions. This problem is particularly acute in view of the growing trend to employ software or firmware for IoT devices as a mechanism for updating, reviewing, renewing or refreshing devices such that two identical IoT devices can execute different software or firmware versions and being exposed to correspondingly different threats. Indeed, the very network connected nature of such IoT devices leads to the propensity for their updating by software and/or firmware.

SUMMARY

Thus there is a need to address the aforementioned challenges.

The present disclosure accordingly provides, in a first aspect, a computer implemented method to identify a computer security threat based on communication of a network connected device via a computer network, the method comprising: receiving a plurality of blocks of network traffic from the device, each block including a sequence of network traffic data items being identifiable by a position in the sequence of the block; identifying a subset of positions occurring in every block for which a degree of variability of values of data items in each position of the subset meets a predetermined threshold; generating executable code for performing a plurality of processing operations based on the identified subset of positions, the executable code consuming a determinate quantity of computing resources when executed for the received network traffic, wherein the executable code is suitable for detecting a subsequent network communication as a block of network traffic having a sequence of data items for which the identified subset of positions fails to exhibit a degree of variability meeting the predetermined threshold, the detection being based on a comparison of a measure of resources consumed by a computer system executing the executable code and the determinate quantity of computing resources, and the detection corresponding to the identification of a computer security threat.

In some embodiments the executable code is Ethereum code.

In some embodiments the device is an internet of things device.

In some embodiments the device has associated a unique identifier and the executable code has associated the unique identifier.

In some embodiments the predetermined threshold is defined to identify an absence of variability of values of data items in each position of the subset.

In some embodiments identifying a subset of positions includes using a machine learning algorithm to identify positions in every block at which data items exhibit at least a predetermined degree of consistency.

In some embodiments the machine learning algorithm is an unsupervised algorithm such as an auto encoder.

In some embodiments the machine learning algorithm is a restricted Boltzmann machine.

The present disclosure accordingly provides, in a second aspect, a computer system including a processor and memory storing computer program code for performing the method described above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
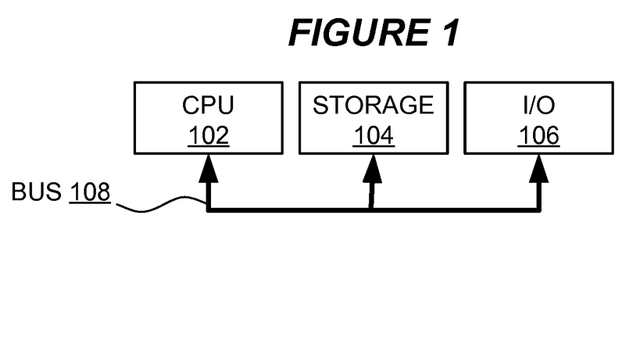
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
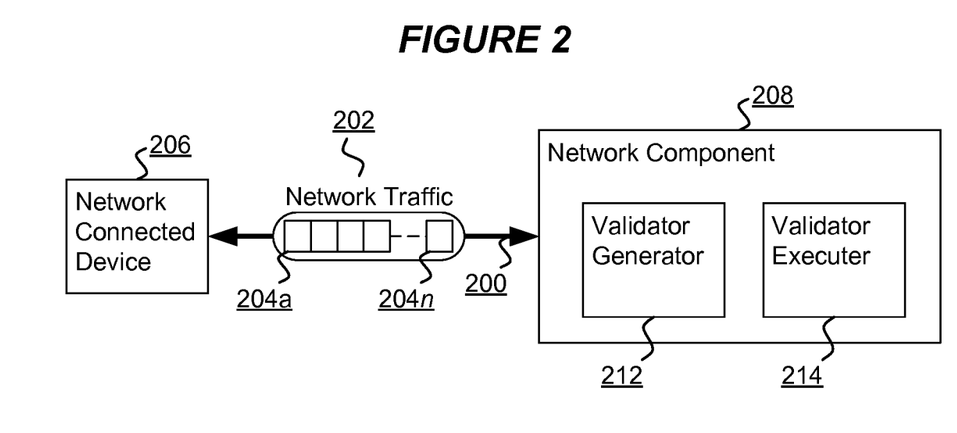
FIG. 2 is a component diagram of a system to identify computer security threats based on communication of a network connected device via a computer network in accordance with an embodiment of the present disclosure.

FIG. 2 is a component diagram of a system to identify computer security threats based on communication of a network connected device 206 via a computer network 200 in accordance with an embodiment of the present disclosure. The network connected device 206 is conceivably any network connected device such as devices hereinbefore described including IoT devices. The network device 206 communicates via a computer network 200 such as a wired or wireless communications network employing one or more network protocols. The device 206 is operable in communication with a network component 208 such as a network appliance, network connected server or the like. For example, network component 208 is a router, switch, hub, proxy, server or other network connected device. In one embodiment the network component 208 is an internet access point such as a home router, wired or wireless access point, or a Home Hub provided by BT. The network component 208 receives communications from the device 206 as blocks of network traffic 202 (one illustrated) including a plurality of network traffic data items 204a to 204n. For example, a block 202 of network traffic can include a packet, message, frame, datagram, or other transmission unit or part thereof. The data items 204a to 204n inside block 200 are sequenced such that each data item is identifiable by a position in the sequence. Thus data item 204a can be said to have a first (or zeroth) position in the block, and so on. Data items 204a to 204n can be individual fields within the block 200, fixed length data items such as a fixed number of bytes, a single byte or even a single bit.

The network component 208 includes a validator generator 212 for generating a validator software routine for identifying a computer security threat as described below. The validator generator 212 is a hardware, software, firmware or combination component. The validator generator 212 initially identifies the network connected device 206 based on the network traffic 202 such as by extracting an identifier, name, model, version, revision or other identification of the device 206. The validator generator 212 subsequently measures a degree of variability of values for each of the data items 204a to 204n across a plurality of blocks of network traffic 202. Thus the validator generator 212 accesses multiple blocks 202, each including a plurality of sequenced data items 204a to 204n, and for each of the data items a degree of variability of values of the data item is identified.

The degree of variability measured by the validator generator 212 can be determined by a machine learning technique such as an autoencoder to receive and process a sequence of data items 204a to 204n for each block of network traffic 202 and autoencode the data items to identify positions of data items in the sequence of all blocks that exhibit a degree of variability of values that meets a predetermined threshold. For example, identifying positions of data items in all blocks for which the variability is zero or very low can be desirable. Such identified positions therefore constitute a subset of positions occurring in every block for which a degree of variability of values of data items in each position in the subset meets the predetermined threshold. An example of the application of autoencoding machine learning techniques to network traffic is described in "The Applications of Deep Learning on Traffic Identification" (Zhanyi Wang, 2015). In one embodiment the autoencoding process is undertaken by use of a restricted Boltzmann machine so as to provide efficient autoencoding such as is described in the paper "An Introduction to Restricted Boltzmann Machines" (Asja Fischer and Christian Igel, 2012, in "Progress in Pattern Recognition, Image Analysis, Computer Vision and Applications" Volume 7441 of the series Lecture Notes in Computer Science pp 14-36).

Thus the validator generator 212 identifies a subset of positions in blocks of network traffic 202 having low or no variability according to a threshold and such positions therefore serve to characterize the blocks of network traffic 202 for the device 206. Accordingly, the subset of positions in the blocks of network traffic 202 and one or more examples of blocks of network traffic 202 itself can be used for subsequent network communication for the device 206 or devices identical to the device 206 to identify subsequent blocks of network traffic having sequences of data items that are inconsistent with the learned low variability positions. The examples of the network traffic 202 itself that is used to identify the subset of positions and can be used to confirm conformance with the characteristics of the network traffic 202 based on the subset of positions is stored as an exemplar network traffic for comparison with subsequent network traffic. Such identified subsequent blocks of network traffic can be flagged as potentially problematic communication as it is inconsistent with expected communication for the network connected device 206. For example, such identified inconsistent blocks of network traffic can be discarded, prevented from ongoing communication, flagged for investigation of the source device, cause the source device to be scanned, reviewed or otherwise processed by security service or software such as malware detection or intrusion detection facilities and the like.

In some embodiments the validator generator 212 associates the identifier of the device 206 with the identified subset of positions in order to ensure the subset of positions are applied only to monitor subsequent traffic originating from an identical (or determined to be compatible) network connected device 206.

The mechanism for checking subsequent network traffic based on the identified subset of positions of low variability data items is deployed using executable code that can be communicated to, and executed by, a validator executor 214 at the network component or network components elsewhere in a computer network or in a different computer network for monitoring blocks of network traffic arising from identical or compatible network connected devices 206 arising elsewhere in the network or in the different network. Thus the validator generator 212 is further adapted to generate executable code for, when executed by the validator executor 214, performing a plurality of processing operations based on the identified subset of positions. A key characteristic of the executable code is that it is adapted to consume a determinate quantity of computing resources when executed for a block of network traffic having data items with low variability from the identified exemplar network traffic 202 at positions identified in the subset of positions. That is to say that a deviation of network traffic from the exemplar network traffic 202 at the positions in the subset of positions is identified by a deviation in the computing resources consumed by the executable code from the determinate quantity of resource. Thus the executable code is provided so as to involve the determinate quantity of resource for consistent network traffic and in all other circumstances to involve a quantity of resource that deviates from the determinate quantity. This can be achieved, for example, by performing a comparison between the exemplar block of network traffic and a subsequent block at each data item position in the subset of positions for a degree of variability within the predetermined threshold so causing a path of computing logic that necessarily involves a determinate consumption of computing resource. Any data items that fail to exhibit the requisite degree (or range of degrees) of variability will fail to follow such path and the consumption of resource will deviate from the determinate consumption. Thus the validator executor 214 is a component of the network component 208 that is adapted to execute the executable code generated by the validator generator 212.

In one embodiment the executable code is provided as Ethereum code such as an Ethereum account for execution by one or more network components 208 as Ethereum miner as described in detail in "Ethereum: A Secure Decentralised Generalised Transaction ledger" (Dr. Gavin Wood, 2015) and "A Next-Generation Smart Contract and Decentralized Application Platform" (Ethereum White Paper, 2016, github.com/ethereum/wiki/wiki/White-Paper). In such an embodiment the validator executor 214 is a component of an Ethereum network, blockchain or system, such as an Ethereum miner. Ethereum code is beneficial because resource consumption by Ethereum miners is consistently the same for the same code and is charged by way of the virtual "ether" currency. Accordingly, identity in measures of resource consumed by even disparate computer systems executing the Ethereum code can be confirmed by recognizing the same extent of expenditure of "ether" (or "gas" as described in the Ethereum papers) for execution of the code. Ethereum accounts or contacts can encode the executable code and further store the exemplar block of network traffic or at least the data items at each position in the subset of positions for reference at runtime when processing a subsequent block of network traffic. Yet further, an association of an identifier of the network connected device 206 with the executable code provides for assurance at execution time that the comparisons of data items at the subset of positions are appropriate for a device as origin of a block of network traffic.

Thus, in this way, embodiments of the present disclosure provide identification of computer security threats by way of deviations from expected resource consumption by executable code performing a plurality of processing operations based on an identified subset of positions of low variability data items in network traffic. The subset of positions can be determined based on an unsupervised machine learning approach such as autoencoding so avoiding a need for user provided definitions. An identifier of a network connected device 206 can be employed in association with the subset of positions to ensure validation executors 214 located potentially remotely or in disparate arrangements or having many disparate or differing versions of network connected devices 206 can identify appropriate blocks of network traffic for processing with reference to a particular definition of a subset of positions. Further, the validator executor 214 provides for the consistent execution of executable code generated based on the identified subset of positions so that a comparison of computing resource consumed by execution serves as an indicator of deviation from an expected network traffic to identify potential threats communicated via the network 200.

Figure 3:
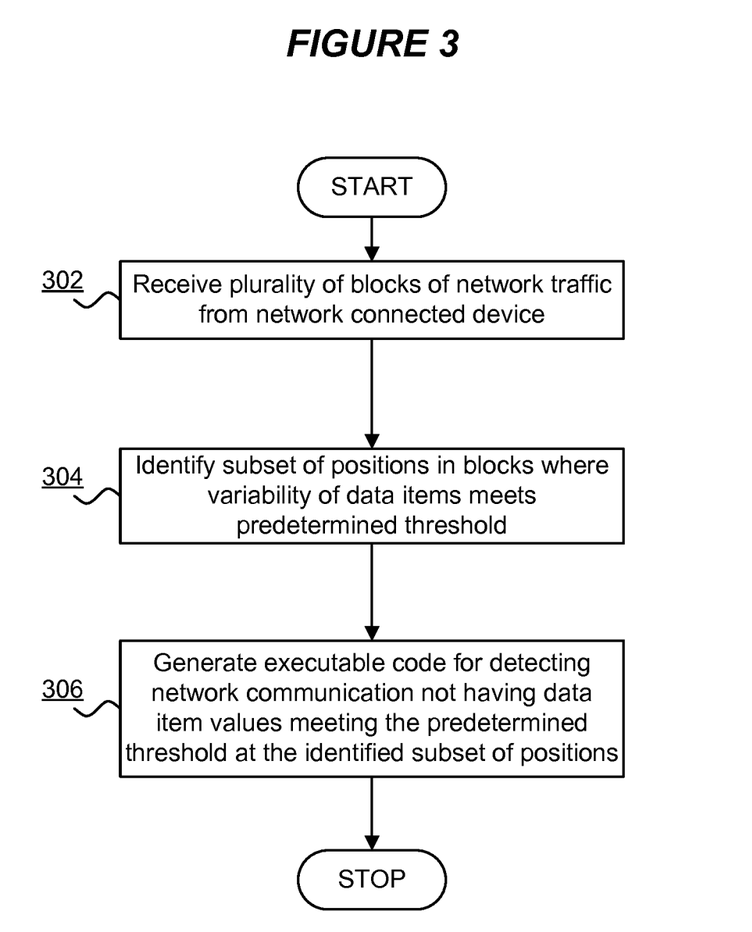
FIG. 3 is a flowchart of a method for identifying computer security threats based on communication of a network connected device via a computer network in accordance with an embodiment of the present disclosure.

FIG. 3 is a flowchart of a method for identifying computer security threats based on communication of a network connected device via a computer network in accordance with an embodiment of the present disclosure. Initially, at 302, a plurality of blocks of network traffic are received from the device 206. Each block includes a sequence of network traffic data items being identifiable by a position in the sequence of the block. At 304 a subset of positions occurring in every block for which a degree of variability of values of data items in each position of the subset meets a predetermined threshold are identified. At 306 executable code is generated for performing a plurality of processing operations based on the identified subset of positions. The executable code consumes a determinate quantity of computing resources when executed for the received network traffic and is therefore suitable for detecting a subsequent network communication that fails to exhibit a degree of variability meeting a predetermined threshold. The detection is based on a comparison of a measure of resources consumed by a computer system executing the executable code and the determinate quantity of computing resources, and the detection corresponding to the identification of a computer security threat.

Figure 4:
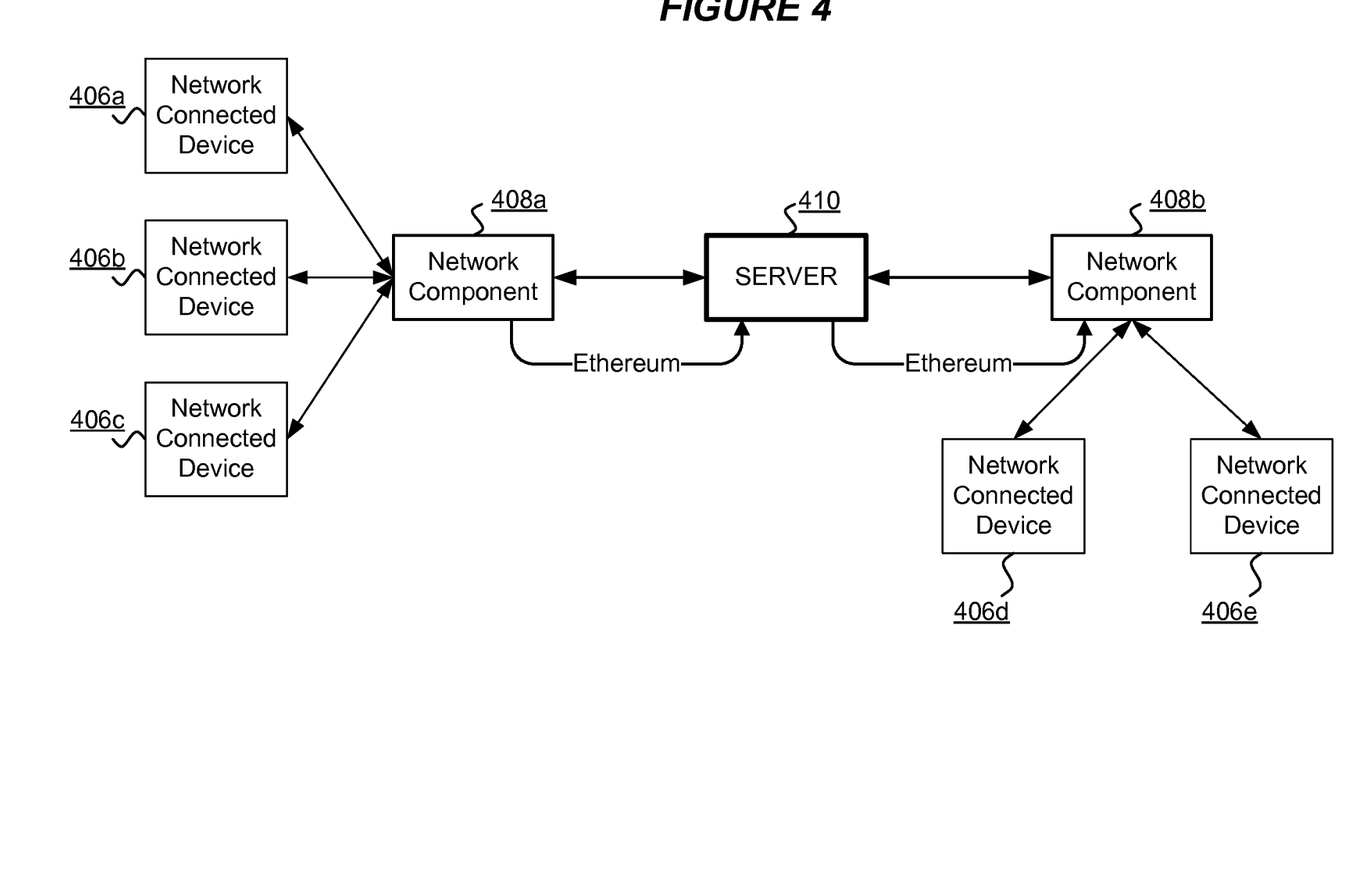
FIG. 4 is a component diagram of an arrangement of a distributed embodiment of the present disclosure.

FIG. 4 is a component diagram of an arrangement of a distributed embodiment of the present disclosure. In the arrangement of FIG. 4 multiple network components are provided 4081, 408*b* each being in network communication with a plurality of network connected devices. Network component 408*a* performs the method of FIG. 3 to generate executable code based on identified subset of positions of data items as Ethereum code. The Ethereum code is communicated to a server 410 as a central authority for the exchange of executable code for the monitoring of network traffic. The Ethereum code has associated an identification of a particular network device, type of network device, compatible network device, release or version of network device or the like. The server 410 subsequently propagates the Ethereum code to the second network component 408*b* which employs the Ethereum code for the monitoring of network traffic from network devices identified in association with the Ethereum code. Thus, in this way the network components 408*a*, 408*b* devise and share threat detection code along with an identification of network connected devices for which such code is appropriate. In the event that network either network component 408*a*, 408*b* identifies a deviation in resource consumption by the executable Ethereum code for network traffic from a compatible device, the network component 408*a*, 408*b* can take remedial, protective or corrective action such as by discarding the network traffic, intervening with/disconnecting an originating network device, or flagging the potential or actual threat to a user. Additionally, such identified actual or potential threats can be communicated to the server 410 along with a block of network traffic for which the threat was identified for further or more detailed analysis. Additionally, the server 410 can communicate threat identifications between network components to elevate security levels consistently across the network(s).

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to identify a computer security threat based on communication of a network connected device via a computer network, the method comprising:
   receiving a plurality of blocks of network traffic from the device, each of the plurality of blocks including a sequence of network traffic data items being identifiable by a position in the sequence of the block;
   identifying a subset of positions occurring in every block for which a degree of variability of values of data items in each position of the subset meets a predetermined threshold; and
   generating executable code for performing a plurality of processing operations based on the identified subset of positions, the executable code consuming a determinate quantity of computing resources when executed for the received network traffic,
   wherein the executable code is suitable for detecting a subsequent network communication as a block of network traffic having a sequence of data items for which the identified subset of positions fails to exhibit a degree of variability meeting the predetermined threshold, the detection being based on a comparison of a measure of resources consumed by a computer system executing the executable code and the determinate quantity of computing resources, and the detection corresponding to the identification of a computer security threat.

2. The method of claim 1, wherein the executable code is Ethereum code.

3. The method of claim 1, wherein the device is an internet of things device.

4. The method of claim 1, wherein the device has associated a unique identifier and the executable code has associated the unique identifier.

5. The method of claim 1, wherein the predetermined threshold is defined to identify an absence of variability of values of data items in each position of the subset.

6. The method of claim 1, wherein identifying a subset of positions includes using a machine learning algorithm to identify positions in every block at which data items exhibit at least a predetermined degree of consistency.

7. The method of claim 6, wherein the machine learning algorithm is an unsupervised algorithm.

8. The method of claim 6, wherein the machine learning algorithm is a restricted Boltzmann machine.

9. A non-transitory computer-readable storage medium storing a computer program element comprising computer program code to, when loaded into a computer system and executed thereon, cause the computer to perform the method as claimed in claim 1.

10. The method of claim 7, wherein the unsupervised algorithm is an autoencoder.

11. A computer system comprising:
    a processor and memory storing computer program code for identifying a computer security threat based on communication of a network connected device via a computer network, the processor and memory configured to:
    receive a plurality of blocks of network traffic from the device, each of the plurality of blocks including a sequence of network traffic data items being identifiable by a position in the sequence of the block;

identify a subset of positions occurring in every block for which a degree of variability of values of data items in each position of the subset meets a predetermined threshold; and generate executable code for performing a plurality of processing operations based on the identified subset of positions, the executable code consuming a determinate quantity of computing resources when executed for the received network traffic, wherein the executable code is suitable for detecting a subsequent network communication as a block of network traffic having a sequence of data items for which the identified subset of positions fails to exhibit a degree of variability meeting the predetermined threshold, the detection being based on a comparison of a measure of resources consumed by a computer system executing the executable code and the determinate quantity of computing resources, and the detection corresponding to the identification of a computer security threat.

* * * * *